United States Patent [19]  [11] Patent Number: 4,553,184
Ogishima  [45] Date of Patent: Nov. 12, 1985

[54] MAGNETIC HEAD SLIDER

[75] Inventor: Kiichiro Ogishima, Yokohama, Japan

[73] Assignee: Tokyo Shibaura Denki Kabushiki Kaisha, Kawasaki, Japan

[21] Appl. No.: 399,264

[22] Filed: Jul. 19, 1982

[30] Foreign Application Priority Data

Jul. 31, 1981 [JP] Japan ................. 56-120134

[51] Int. Cl.[4] .................. G11B 5/60; G11B 15/64; G11B 17/32
[52] U.S. Cl. ...................... 360/103; 360/104
[58] Field of Search .............. 360/102–103, 360/120, 122, 104

[56] References Cited

U.S. PATENT DOCUMENTS 4,081,846  4/1978  Roscamp .................. 360/103

FOREIGN PATENT DOCUMENTS 55-12542  1/1980  Japan ..................... 360/103
617783    7/1978  U.S.S.R. ................. 360/103
787453    5/1979  U.S.S.R. ................. 360/103

OTHER PUBLICATIONS

Patents Abstracts of Japan, vol. 3, No. 86(E-125), 24th Jul. 1979, p. 135E125.
Review of the Electrical Communication Laboratories, vol. 21, Nos. 7-8, Jul./Aug. 1973, pp. 448–464, Tokyo, JP.

Primary Examiner—John H. Wolff
Attorney, Agent, or Firm—Oblon, Fisher, Spivak, McClelland & Maier

[57] ABSTRACT

A magnetic head slider having a high-pressure producing bottom surface which defines a path for passing compressed air streams produced by the rotation of a magnetic disc which flow between the magnetic head and the magnetic disc. The high pressure producing bottom surface is provided with pressure-reducing inclined grooves which separate a portion of the compressed air streams and guide them diagonally downstream to the outside.

8 Claims, 6 Drawing Figures

MAGNETIC HEAD SLIDER

BACKGROUND OF THE INVENTION

This invention relates to a magnetic head slider whose bottom plane is supported to face the operation plane of a magnetic disc and on which a cooperating magnetic head is mounted, the bottom plane being provided with high pressure applying-planes facing the magnetic head between the planes and the magnetic head external air streams are introduced by the rotation of the magnetic disc to produce compressed air streams and thus defining a compressed air stream path causing the slider and magnetic head to be removed from the operation plane of the magnetic disc.

The conventional magnetic memory device is generally of the type which is constructed by stacking a plurality of magnetic discs around a rotary shaft rotated by a proper drive mechanism at a substantially equal distance (such assembly is referred to as "a disc stack"). Set near the disc stack is a carriage which is made movable in parallel with the rotary shaft as well as radially thereof. The outer end of each of the access arms extending outward form the carriage is fitted with a magnetic head. The drive of the carriage causes the magnetic head to the shifted to a desired track formed on the magnetic disc, thereby enabling the reading of data from said track or the writing of data therein. The above-mentioned magnetic disc type memory device which is widely accepted still has much room to be improved. Reference is now made to said drawbacks. The magnetic head is fixed to a slider elastically attached to the end of the access arm by means of a load spring and gimbals mechanism. The conventional slider is typically illustrated in FIG. 1. A magnetic head is fixed to a slider 10 (in FIG. 1, only the core 11 of the magnetic head is indicated). The bottom plane of the slider 10 is provided with three ridges 12, 13, 14 which extend in parallel lengthwise of the slider 10 and project downward substantially to the same extent. A long groove 15 is defined between the ridges 12 and 13. A long groove 16 is similarly defined between the ridges 13 and 14. The left end portion of the ridges 12, 13, 14 as viewed from FIG. 1 is respectively provided with an inclined plane 12a, 13a, 14a. The height of said inclined plane is progressively reduced toward the tip of the left end portion.

The slider 10 is held in such a position that the respective upper flat planes 12b, 13b, 14b of the ridges 12, 13, 14 are positioned in parallel with the operation plane of the co-operating magnetic disc, and that the upper flat planes 12b, 13b, 14b are very closely spaced from the operation plane of the magnetic disc in order to cause external air streams produced around the slider 10 by the rotation of the magnetic disc to forcefully strike the aforesaid inclined planes 12a, 13a, 14a from the left side of FIG. 1.

When the magnetic disc ceases to rotate, the slider 10 contacts the magnetic disc by the urging face of the load spring. When reaching a certain rotation speed, the magnetic disc is pushed by air streams striking against the inclined planes 12a, 13a, 14a and is brought to a floating state. As a result, external air streams removing from the operation plane of the magnetic disc flow through a narrow passage defined between the operation plane of the magnetic disc and the upper flat planes 12b, 13b, 14b of the ridges 12, 13, 14 and are drawn off to the right side of FIG. 1. At this time compressed air streams are produced in the narrow passage, causing the slider 10 to be removed substantially to a predetermined position agains the urging force of the load spring. Therefore, the narrow passage is hereinafter referred to as "a high pressure path". The long groove 15 defined between the ridges 12, 13 and the long groove 16 defined between the ridges 13, 14 allow for the substantially free flow of a certain portion of air streams running through a space defind between the slider 10 and the operation plane of the magnetic disc. Consequently said long grooves 15, 16 are effective to reduce the amount of compressed air streams conducted through the above-defined high pressure path, thereby properly controlling a floating face applied to the slider 10.

When the slider 10 having the aforementioned construction is used and the magnetic head is positioned near the center of the magnetic disc, then the magnetic disc is rotated at a low speed. Therefore, air streams coming into a space defined between the slider 10 and magnetic disc has a relatively low pressure, causing the slider 10 to float from the operation plane of the magnetic disc with a low force. Conversely when the magnetic head is drawn near the periphery of the magnetic disc, the slider 10 floats from the operation plane of the magnetic disc with a stronger force. In other words, the distance at which the slider 10 or the magnetic head is removed from the magnetic disc varies with the position occupied by the slider 10 radially of the magnetic disc. Consequently, when the distance is large, the conventional magnetic head slider has a drawback that the recording and reproduction property of a magnetic disc type memory device is reduced; and when the distance is small the drawback is such that the surface of the magnetic disc is required to be worked accurately to prevent contacting of the disc surface with the magnetic head.

SUMMARY OF THE INVENTION

It is accordingly the object of this invention to provide a magnetic head slider which enable a substantially constant distance to be maintained between the magnetic head and magnetic disc, no matter how the magnetic head is positioned radially of the magnetic disc.

To attain the above-mentioned object, this invention provides a magnetic head slider wherein a pressure-reducing inclined groove are formed on the high pressure-applying planes in the downstream side of compressed air streams flowing through the high pressure-applying planes to divide the compressed air streams, thereby causing the divided portions of said compressed air streams to be drawn off obliquely downstream from the magnetic head slider.

The high pressure path through which compressed air streams run is set substantially tangentially to the track on which the magnetic disc acts. The relationship between the flow rate of compressed air streams drawn off to the outside from the high pressure path and the flow speed of external air streams supplied to the slider, that is, reduction in the pressure of the compressed air streams can be controlled over a wide range by properly selecting any of such factors as the degree in which the pressure-reducing inclined groove is inclined to the high pressure path, the size of said inclined groove and a curvature, if applied to said inclined groove.

With a magnetic head slider 10 embodying this invention which comprises a pressure-reducing inclined groove whose various factors described above have been properly selected, a floating force prominently increasing around the periphery of the magnetic disc is reduced by causing part of compressed air streams conducted through the pressure-reducing inclined groove to idly escape. Consequently it is possible to let the slider 10 and magnetic head float from the operation plane of the magnetic disc with substantially one same force, no matter how the magnetic head is positioned radially of the magnetic disc. Application of the magnetic head slider of this invention offering the aformentioned advantages can obviously improve the recording and reproducing properties of a magnetic disc type memory device.

The above-mentioned pressure-reducing inclined groove can be formed by a simple work process such as etching, thereby enabling a magnetic head slider to be manufactured at low cost.

With one preferred embodiment of this invention, a large number of air-receiving sections are provided on the upstream side of the magnetic head slider on which external air streams are brought in. The air-receiving section may be formed by constructing an inclined plane progressively removed from the magnetic disc toward the upstream side on the upstream side of the bottom of the slider which faces the operation plane of the magnetic disc, or as later described with reference to another embodiment of the invention, it is possible to provide an air-receiving pressure-increasing inclined groove on the upstream side of the bottom of the slider between said slider and the operation plane of the magnetic disc. The relationship between the flowing speed of air streams introduced from the outside and the level of the pressure of compressed air streams, that is, the pressure-increasing property of the slider can be varied freely by properly selecting the size, shape and curvature of the inclined groove as in the case of the pressure-reducing inclined groove. Application of both pressure-increasing and pressure-reducing inclined grooves enables the slider and magnetic head to float with a more uniform force than in the case when only the pressure-reducing inclined groove is used.

DETAILED DESCRIPTION OF THE PREFERRED EMBODIMENTS

Figure 1:
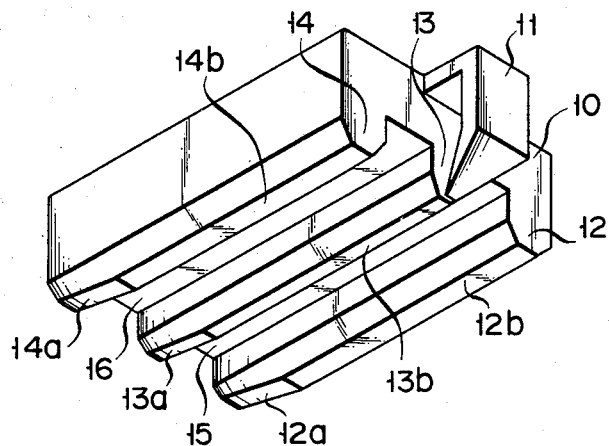
FIG. 1 is an oblique view of the conventional magnetic head slider.
Figure 2:
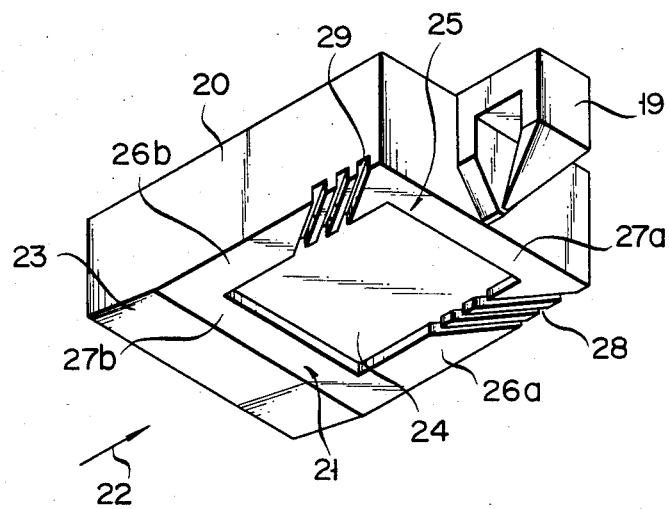
FIG. 2 is an oblique view of a magnetic head slider according to one embodiment of this invention.

FIG. 2 is an oblique view of a magnetic head slider embodying this invention as taken from the side of a magnetic disc. The right side of the slider is fitted with a magnetic head (for briefness of representation, only a magnetic head core 19 is indicated. The same applies to FIGS. 4, 5 and 6). The body of a slider 20 has a shape of substantially rectangular prism. It is assumed that when a magnetic disc (not shown) facing the bottom plane 21 of the slider 20 is rotated, incoming air streams flow in the direction of an arrow 22 indicated in FIG. 2. The bottom plane 21 of the slider 20 is provided with an inclined plane 23 widely open to incoming external air streams and a square depression 24. On the periphery of the square depression 24 is formed a rectangular frame 25. The four surfaces of said frame 25 are respectively denoted by 26a, 27a, 26b, 27b. The surfaces 26a, 26b extend in the direction of the indicated arrow 22. The surfaces 27a, 27b extend in a direction intersecting that of the arrow 22 substantially at right angles. Two groups of pressure-reducing inclined grooves 28, 29 are provided on the downstream side of the surfaces 26a, 26b of the rectangular frame 25 to which incoming air streams rum in the direction of the arrow 22. (For briefness of representation each group are shown to consist of only three pressure-reducing inclined grooves.) The inclined grooves 28, 29 are formed substantially parallel with the surfaces 26a, 26b and extend in such direction that the inclined grooves 28 and 29 are progressively more removed from each other toward the downstreame side of the rectangular frame 25.

The grooves 28, 29 extend from the inner periphery of the square depression 24 to the downstream outer sides of the mutually facing surfaces 26a, 26b.

Figure 3:
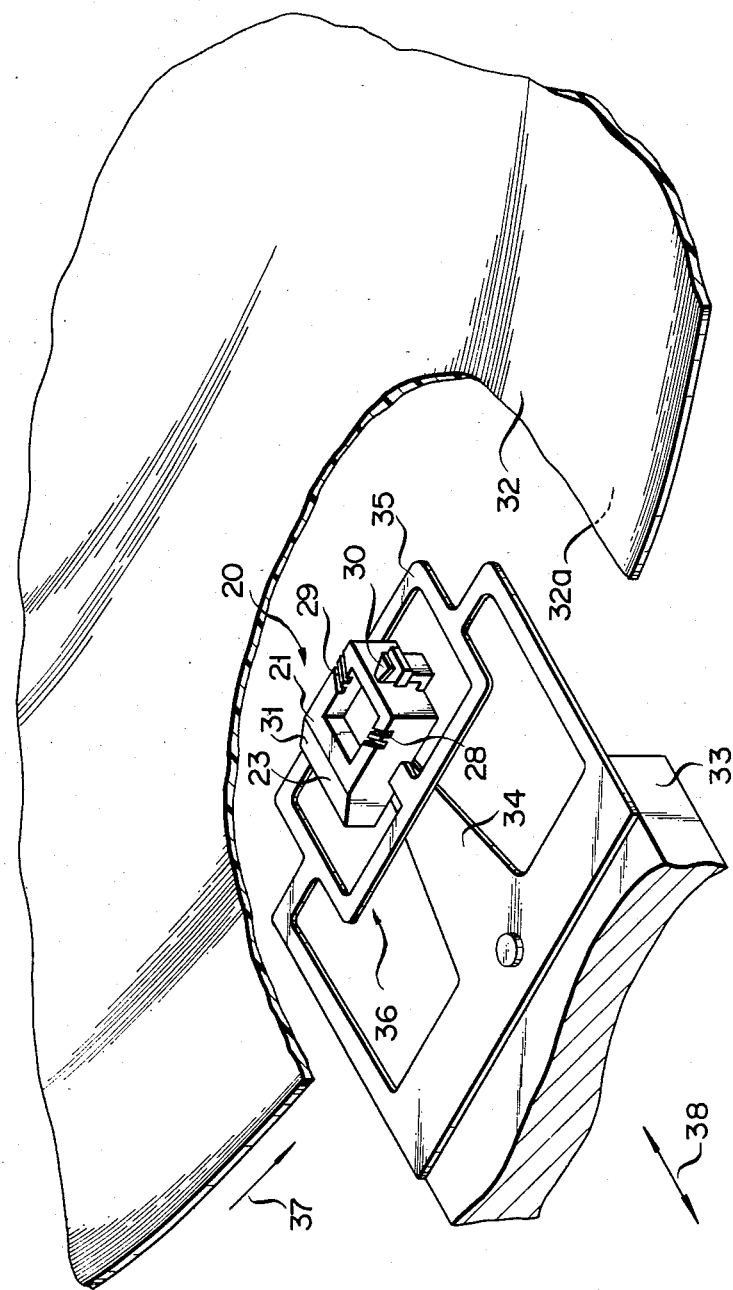
FIG. 3 partly illustrates a magnetic disc type memory device using the magnetic head slider of FIG. 2.

FIG. 3 obliquely illustrates part of a magnetic disc type memory device provided with the magnetic head slider of FIG. 2, showing a magnetic head 30 and slider 20 set under a magnetic disc 32. An access arm 33 attached to a carriage (not shown) is fitted with the slider 20 by means of an elastic member 36 consisting of a load spring 34 and gimbal mechanism 35. The magnetic disc 32 is rotated in the direction of an indicated arrow 37, and the access arm 33 reciprocates in the mutually opposite directions of two indicated arrows 38, thereby enabling an electric signal to be read from or written in various tracks formed on the operation plane 32a of the magnetic disc 32.

When the magnetic disc 32 is rotated, external air streams produced by friction between air around the periphery of said disc 32 and the operation plane 32a thereof impinge on an inclined plane 23 of the slider 20. As a result, the slider 20 which is pressed against the operation plane 32a of the magnetic disc 32 during the stop of the magnetic disc 32 is made to float from the operation plane 32a thereof. Therefore, the aforementioned external air streams are carried into a space defined between the slider 20 and the operation plane 32a.

The external air streams pass in the compressed form through a high pressure path defined between the magnetic disc 32 and the mutually facing surfaces 26a, 26b of the rectangular frame 25, and then are drawn off to the outside. While being conducted through the high pressure path, part of the compressed air streams is sent forth to the outside through the pressure-reducing inclined grooves 28, 29. Other air streams than those which flow along the mutually facing surfaces 26a, 26b of the rectangular frame 25 flow over the square depression 24 and continue to run in the direction of the arrow 22 (FIG. 2) and are discharged to the outside from the right end of the slider 20 as viewed from FIGS. 2 and 3. Air streams carried along the bottom plane of the depression 24 do not substantially assist the floating of the slider 20. This floating is effected by the action of compressed air streams conducted along the mutually facing surfaces 26a, 26b of the rectangular frame 25. In this sense, said surfaces 26a, 26b are referred to as "high pressure-applying planes". When the area of the square depression 24 is properly chosen, then it is possible to apply a proper floating force to the slider 20. As the slider 20 approaches the periphery of the magnetic disc 32, more compressed air streams flow through the high pressure path defined between the operation plane 32a of the magnetic disc 32 and the mutually facing surfaces 26a, 26b of the rectangular frame 25. As a result, the slider 20 tends to float to a point more removed from the operation plane 32a of the magnetic disc 32 than when the slider 20 lies near the center of the magnetic disc 32. However, the slider 20 embodying this invention is constructed by providing two groups of, pressure-reducing inclined grooves 28, 29 on the mutually facing surfaces 26a, 26b of the rectangular frame 25. Part of compressed air streams flowing through the high pressure path is drawn off through the grooves. Therefore, the slider 20 floats to a smaller extent than when said grooves 28, 29 are omitted.

Where, therefore, the size, position and number of the pressure-reducing inclined grooves 28, 29, as well as the direction in which they are inclined are suitably selected, and the relationship between the running speed of external air streams and the magnitude of pressure of the compressed air streams, namely, the pressure-reducing property of the grooves 28, 29 is properly determined, then the slider 20 can float from the operation plane 32a of the magnetic disc 32 at a substantially uniform distance, no matter whichever track the magnetic disc 32 is accessed by the magnetic head 30.

Figure 4:
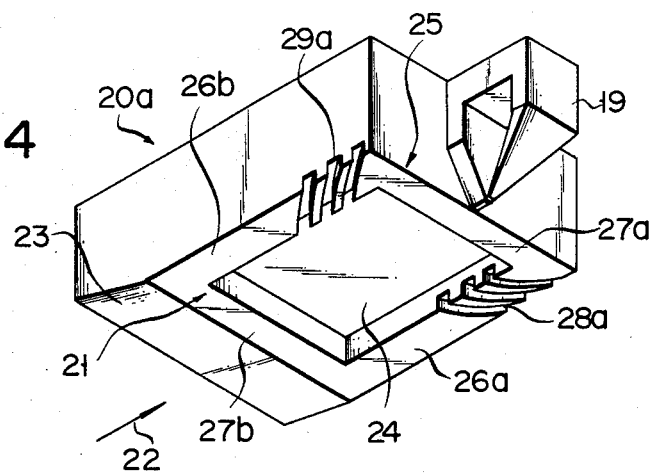
FIG. 4 is an oblique view of a modification of the magnetic head slider of FIG. 3.

Description is now given with reference to FIG. 4 of one modification 20a of the magnetic head slider 20 of FIG. 2 embodying this invention. This modification is different from the embodiment of FIG. 2 only in that the pressure-reducing inclined grooves 28a, 29a are gently curved outward. Proper selection of the curvature of said pressure-reducing inclined grooves assures their suitable pressure-reducing property.

Figure 5:
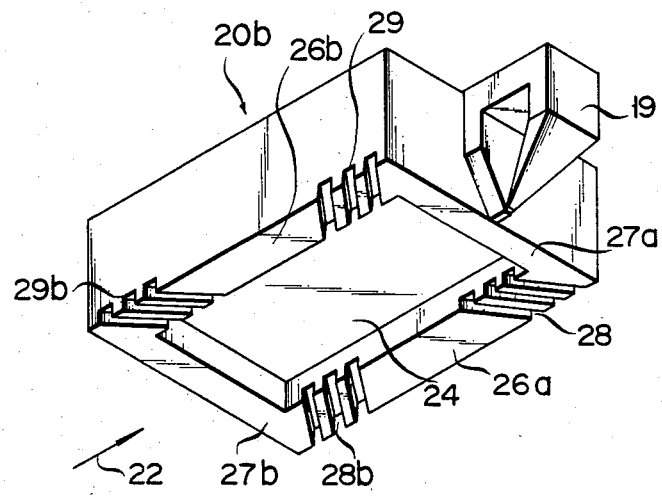
FIG. 5 is an oblique view of a magnetic head slider according to another embodiment of the invention.

Discription is now given with reference to FIG. 5 of another modification 20b of the magnetic head slider of FIG. 2. This modification is different from the embodiment of FIG. 2 only in that two groups of linear parallel pressure-increasing inclined grooves 28b, 29b are formed in the upstream regions of the mutually facing surfaces 26a, 26b of the rectangular frame 25 in addition to the two groups of pressure-reducing inclined grooves 28, 29 of the embodiment of FIG. 2. The pressure-increasing inclined grooves 28b, 29b are formed substantially parallel with the mutually facing surfaces 26a, 26b and extend in such a direction that said grooves 28b, 29b are more removed from each other toward the upstream side of the slider 20b. When the magnetic disc is rotated, said grooves 28b, 29b of pressure-increasing inclined grooves are so actuated as to guide the external air streams to flow through a space defined between the magnetic head slider 20b and the operation plane of the magnetic disc 32 for producing high pressure stream in the space effectively. The relationship between the running speed of the external air streams and a rise in the pressure of compressed air streams conducted through said pressure-increasing inclined grooves 28b, 29b, that is, their pressure-increasing property can be varied by properly selecting the size and number of said grooves 28b, 29b and the direction in which they are inclined to the mutually facing surfaces 26a, 26b. Therefore, a proper combination of the pressure-reducing and pressure-increasing inclined grooves enables the slider 20b and consequently the magnetic head fitted thereto to float from the operation plane of the magnetic disc with a more uniform rate than in the foregoing embodiments of FIGS. 2 and 4, no matter whichever tracks of the magnetic disc is accessed by the magnetic head.

Figure 6:
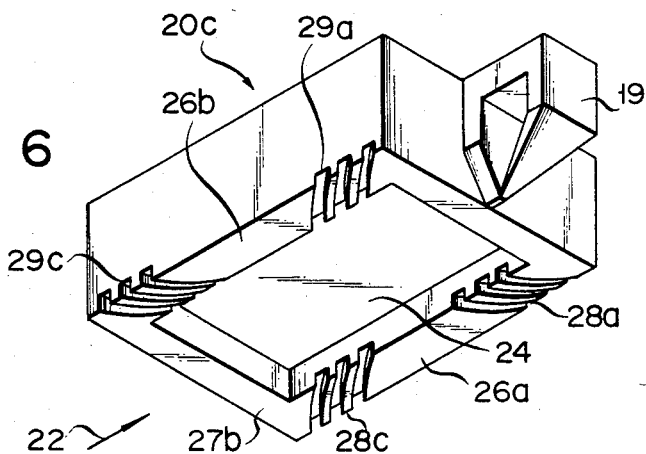
FIG. 6 is an oblique view of a modification of the magnetic head slider of FIG. 5.

Description is now given with reference to FIG. 6 of a modification 20c of the magnetic head slider 20b of FIG. 5. The embodiment of FIG. 6 is different from that of FIG. 5 in that the linear pressure-reducing inclined grooves 28, 29 and linear pressure-increasing inclined grooves 28b, 29b are replaced by inclined grooves 28a, 29a, 28c, 29c, each of which is gently curved outward. In the embodiment of FIG. 6, too, a proper combination of the pressure-reducing and pressure-increasing inclined grooves enables the magnetic head slider 20c and magnetic head fitted thereto to float from the operation plane 32a of the magnetic disc 32 at a substantially uniform rate, no matter whichever tracks of the magnetic disc 32 is accessed by the magnetic head.

What is claimed is:

1. A magnetic head slider for a rearwardly mounted magnetic head comprising:
    a bottom surface which faces the surface of a magnetic disc, said bottom surface having a central area which is recessed and high pressure-applying areas surrounding said central area which are not recessed, thereby provided for an enclosed depression; and
    pressure reducing grooves formed in opposed said high pressure-applying areas and extending diagonally from said central area and through said high pressure-applying areas, said grooves being inclined monotonically to the rear of said head slider; whereby compressed air streams caused by a rotation of a magnetic disc flow between said magnetic disc and said head slider bottom surface and along said high pressure-applying areas, said grooves acting to partially deflect said compressed air stream away from said slide by said pressure reducing grooves.

2. The magnetic head slider according to claim 1, wherein the pressure-reducing inclined grooves extend linearly.

3. The magnetic head slider according to claim 1, wherein the pressure-reducing inclined grooves are curved convexly toward the outside of the slider.

4. The magnetic head slider according to claim 1, wherein the slider is further provided with an inclined plane which is used to receive external air streams and further removed from the operation plane of the magnetic disc toward the upstream side of the slider.

5. The magnetic head slider according to claim 1, wherein the slider is constructed by further providing the high pressure-applying path with a plurality of pressure-increasing inclined grooves which extend to the upstream side of the slider in a state progressively separated nearer to the upstream end of the slider.

6. The magnetic head slider according to claim 5, wherein the pressure-increasing inclined grooves extend linearly.

7. The magnetic head slider according to claim 5, wherein the pressure-increasing inclined grooves are curved convexly toward the outside of the slider.

8. A magnetic head slider according to claim 1, wherein said bottom surface is substantially rectangular, said central area is substantially rectangular and said high pressure-applying areas form a rectangular frame around said central area.

* * * * *